(12) United States Patent
Echizenya

(10) Patent No.: US 10,137,956 B2
(45) Date of Patent: Nov. 27, 2018

(54) INVERTED PENDULUM VEHICLE

(71) Applicant: HONDA MOTOR CO., LTD., Minato-Ku, Tokyo (JP)

(72) Inventor: Takeshi Echizenya, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 71 days.

(21) Appl. No.: 15/614,965

(22) Filed: Jun. 6, 2017

(65) Prior Publication Data

US 2017/0355414 A1 Dec. 14, 2017

(30) Foreign Application Priority Data

Jun. 9, 2016 (JP) ................... 2016-115366

(51) Int. Cl.
| | |
|---|---|
| *B62K 11/00* | (2006.01) |
| *B62K 1/00* | (2006.01) |
| *G05D 1/08* | (2006.01) |
| *B62H 1/02* | (2006.01) |
| *B62J 6/00* | (2006.01) |
| *B62J 25/00* | (2006.01) |
| *B62K 17/00* | (2006.01) |

(52) U.S. Cl.
CPC .............. *B62K 11/007* (2016.11); *B62H 1/02* (2013.01); *B62J 6/00* (2013.01); *B62J 25/00* (2013.01); *B62K 1/00* (2013.01); *G05D 1/0891* (2013.01); *B60L 2200/14* (2013.01); *B60L 2200/16* (2013.01); *B60L 2260/34* (2013.01); *B62K 17/00* (2013.01); *B62K 2207/04* (2013.01)

(58) Field of Classification Search
CPC .......... B62H 1/08; B62H 1/02; B62K 11/007; B62K 1/00; B62K 2207/04; B62K 17/00; B62J 25/00; B62J 25/60; G05D 1/0891; B60L 2200/16; B60L 2260/34; B60L 2200/14
See application file for complete search history.

(56) References Cited

U.S. PATENT DOCUMENTS

| | | | | |
|---|---|---|---|---|
| 4,883,284 | A | * 11/1989 | Nakazawa | ............... B62H 1/02 280/293 |
| 9,061,721 | B2 | 6/2015 | Muto et al. | |
| 9,423,795 | B2 | 8/2016 | Araki et al. | |
| 9,511,656 | B2 | 12/2016 | Muto et al. | |
| 2010/0114420 | A1* | 5/2010 | Doi | ...................... B60N 2/0244 701/31.4 |

(Continued)

FOREIGN PATENT DOCUMENTS

| | | |
|---|---|---|
| JP | 2014-198503 A | 10/2014 |
| JP | 2014-234034 A | 12/2014 |

(Continued)

*Primary Examiner* — Karen Beck
(74) *Attorney, Agent, or Firm* — Carrier Blackman & Associates, P.C.; Joseph P. Carrier; William D. Blackman

(57) ABSTRACT

Provided is an inverted pendulum vehicle including a display unit for providing a guide on an operation for putting the vehicle body into the tilted position from the upright position or into the upright position from the tilted position according to a state of the vehicle. In particular, the display unit indicates a direction in which the vehicle body is required to be moved when placing the vehicle body from the tilted position to the upright position and from the upright position to the tilted position.

9 Claims, 6 Drawing Sheets

(56) References Cited

U.S. PATENT DOCUMENTS

| | | | | |
|---|---|---|---|---|
| 2011/0068738 A1* | 3/2011 | Gomi | ............... | B62J 1/005 |
| | | | | 320/108 |
| 2014/0297126 A1* | 10/2014 | Hasegawa | ............ | G05D 1/0268 |
| | | | | 701/41 |
| 2016/0378106 A1* | 12/2016 | Xie | ............ | G07C 5/06 |
| | | | | 701/2 |
| 2018/0281889 A1* | 10/2018 | Evans | ............ | B62K 11/007 |

FOREIGN PATENT DOCUMENTS

| | | | |
|---|---|---|---|
| JP | 2014-234035 A | 12/2014 | |
| JP | 2015123870 A * | 7/2015 | ............ B62H 1/02 |

* cited by examiner

INVERTED PENDULUM VEHICLE

TECHNICAL FIELD

The present invention relates to an inverted pendulum vehicle, and in particular to an inverted pendulum vehicle that can display a condition of the vehicle to a user.

BACKGROUND ART

An inverted pendulum vehicle equipped with a stand is disclosed in JP2014-234034A. The vehicle can be selectively placed in a parked condition in which the inverted pendulum control is ceased and the vehicle body is supported in a forwardly tilted posture or position with the stand, and in an upright condition in which the vehicle body is maintained in an upright posture or position under the inverted pendulum control.

An inverted pendulum vehicle disclosed in JP2014-198503A allows a control mode to be selected from a plurality of choices and the selected control mode is indicated to the rider by using an indicator.

In the case of the inverted pendulum vehicle disclosed in JP2014-234034A, when the vehicle is to be used from the parked condition, the vehicle body is required to be raised upright from the forwardly tilted position or parked position. Conversely, when the inverted pendulum control is terminated, and the vehicle is to be put back to the parked condition, the vehicle body is required to be tilted forward, and held tilted by using a stand. Therefore, the user is required to take various steps when using the vehicle in the parked condition, and putting back the vehicle to the parked condition. However, this may not be obvious for an inexperienced user, and there is a need to properly guide the user of the vehicle.

In the case of the inverted pendulum vehicle disclosed in JP2014-198503A, the indicator merely notifies the current control mode of the vehicle to the user, and does not provide any guide for an inexperienced user.

SUMMARY OF THE INVENTION

In view of such problems of the prior art, a primary object of the present invention is to provide an inverted pendulum vehicle that provides a guide to the user regarding the operation of the vehicle.

The present invention accomplishes such objects by providing an inverted pendulum vehicle (10) configured to be operated under an inverted pendulum control and comprising a vehicle body (12) including a saddle (14) provided in an upper part of the vehicle body, wherein the vehicle is configured to be selectively placed in a parked condition where the inverted pendulum control is terminated and the vehicle body is supported by a stand in a forwardly or rearwardly tilted position, and an upright condition where the vehicle body is held in an upright position under the inverted pendulum control, the vehicle further comprising a display unit (30) for providing a guide on an operation for putting the vehicle body into the tilted position from the upright position or into the upright position from the tilted position according to a state of the vehicle.

Owing to this arrangement, the user can be guided to correctly put the vehicle body from the upright position to the tilted position, and from the tilted position to the upright position.

In a preferred embodiment of the present invention, the display unit is configured such that when the vehicle body is to be placed from the tilted position to the upright position, the display unit provides a display indicating a direction for bringing the vehicle body to the upright position until the vehicle body is placed in the upright position.

Thereby, the user can be properly guided to move the vehicle body in a direction in which the vehicle body is to be moved to bring the vehicle body to the upright position from the tilted position.

In a preferred embodiment of the present invention, the inverted pendulum control is initialized when a power switch (40) is switched from an off condition to an on condition, and the display unit is configured to start the display indicating the direction for bringing the vehicle body to the upright position upon completion of an initialization of the inverted pendulum control.

Thereby, the user can be notified what should be performed upon completion of an initialization of the inverted pendulum control.

The display unit may be configured such that when a movement to raise the vehicle body from the tilted position to the upright position is detected before the initialization of the inverted pendulum control is completed, the display unit provides a display indicating a direction for bringing the vehicle body to the tilted position.

Thereby, when the user tries to raise the vehicle body to the upright position before the inverted pendulum control is initialized, or when the vehicle is not ready for operation, the user is guided to desist from doing so.

The display unit may be configured such that when a user has dismounted the vehicle while the inverted pendulum control is in progress, the display unit provides a display indicating a direction for bringing the vehicle body to the tilted position until the vehicle body is placed in the tilted position.

Thereby, the user is guided to bring the vehicle to the tilted position (parked position) at an appropriate timing.

The display unit may be configured such that when the vehicle is powered up, and the vehicle body is raised to the upright position, but a fault in the inverted pendulum control is detected, the display unit provides a display indicating a direction for bringing the vehicle body to the tilted position.

Thereby, when an error occurs in the inverted pendulum control, the user is properly guided to put the vehicle body back to the tilted position (parked position) to thereby bring the vehicle in the parked condition to reset the inverted pendulum control.

The display unit may include a plurality of light emitting elements (34) arranged along a direction of moving of the vehicle body between the upright position and the tilted position, the light emitting elements being sequentially turned on and turned off in a direction for guiding a user.

Thereby, the user is intuitively guided to take an appropriate action regarding the handling of the vehicle at the time of parking and at the time of activation.

Alternatively, the display unit includes a light emitting strip (35) extending along a direction of moving of the vehicle body between the upright position and the tilted position, a part of the light emitting strip which differs from adjoining areas of the light emitting strip in luminous intensity and/or color being caused to move in a direction for guiding a user.

Thereby, the user is intuitively guided to take an appropriate action regarding the handling of the vehicle at the time of parking and at the time of activation.

The light emitting elements may be configured to emit light in a plurality of colors.

Thereby, the display may convey additional information such as a distinction between a normal condition and an abnormal condition.

DESCRIPTION OF THE PREFERRED EMBODIMENT(S)

An embodiment of an inverted pendulum vehicle according to the present invention is described in the following with reference to FIGS. 1 to 5.

Figure 1:
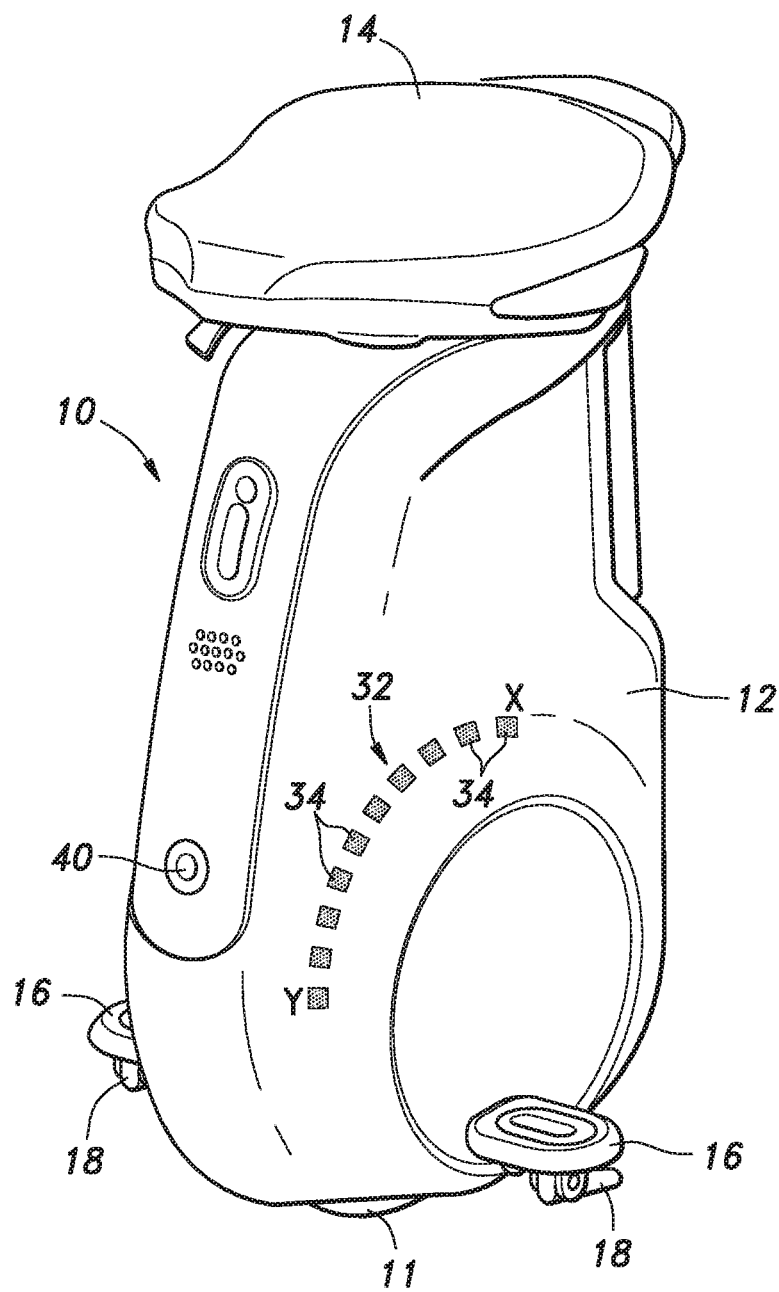
FIG. 1 is a perspective view of an embodiment of an inverted pendulum vehicle according to the present invention.

As shown in FIG. 1, an inverted pendulum vehicle 10 is provided with a vehicle body frame (not shown in the drawings), and an outer shell 12 covering the vehicle body frame. In the following description, the outer shell 12 is referred to as covering the entire vehicle body of the vehicle 10. The vehicle 10 is provided with a main wheel 11 configured as an omni-wheel supported by the vehicle body frame and is controlled by an inverted pendulum control unit 46 so that the vehicle 10 may be enabled to maintain an upright posture and travel in any desired direction under an inverted pendulum control. For the details of the drive unit for the main wheel 11 and the inverted pendulum control unit 46, reference may be made to U.S. Pat. No. 9,511,656. The inverted pendulum control unit 46 may be provided with a self diagnosis unit 50 (FIG. 4) for diagnosing the operation of the inverted pendulum control unit 46.

The vehicle 10 is provided with a saddle 14 in an upper part of the outer shell 12 so that the user may ride the vehicle 10 by seating or mounting on the saddle 14. A pair of foot rests 16 are provided on either side of a lower part of the outer shell 12.

A retractable stand 18 for parking is provided on the lower end of each foot rest 16. By deploying the stands 18 in a forward direction, when the vehicle 10 is tilted forward, the stands 18 engage the ground surface so that the outer shell 12 (or the entirety of the vehicle 10) may be maintained in a forwardly tilted position or in a parked position in a stable manner. When the stands 18 are retracted upward, the tips of the stands 18 are displaced away from the ground surface so that the vehicle 10 may be operated under the inverted pendulum control without being hampered by the stands 18.

A display portion 32 of a display unit 30 is provided on each side face of the outer shell 12. The display portion 32 includes a plurality of light emitting elements 34 arranged from a forward position Y to an upward position X along a circle (over an angular range of about 90 degrees) centered around the rotational center line of the main wheel 11.

Figure 4:
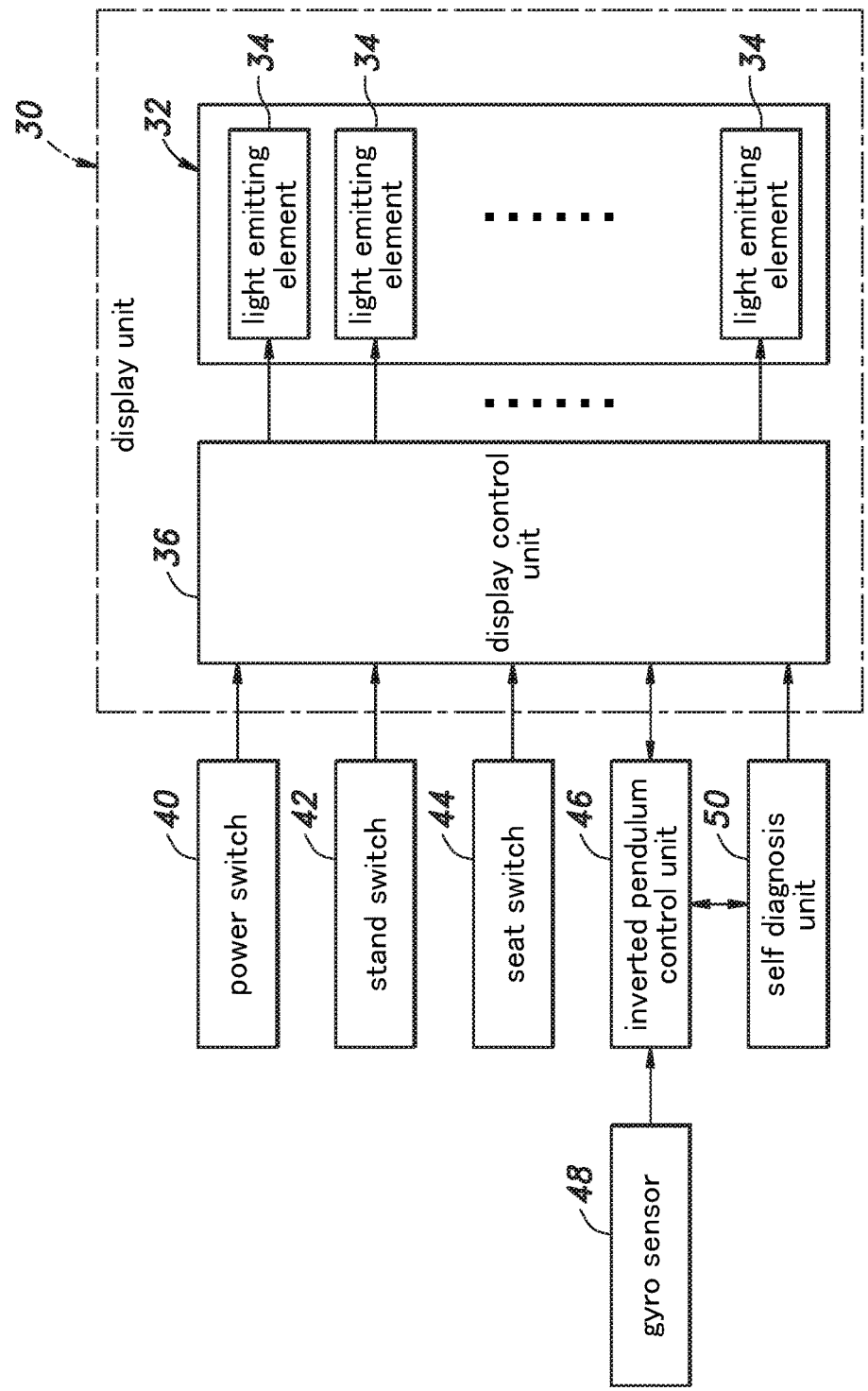
FIG. 4 is a block diagram of a control system of the inverted pendulum vehicle.

FIG. 4 is a block diagram of the display unit 30 and associated components. The display unit 30 comprises a display control unit 36 which essentially consists of a microcomputer. The display control unit 36 receives signals from a power switch 40, a stand switch 42, a seat switch 44, and the inverted pendulum control unit 46, and turns on and off the light emitting elements 34 for guiding an operation to raise the vehicle 10 (outer shell 12) to the upright position or to tilt the vehicle 10 (outer shell 12) to the forwardly tilted position (parked position) according to the state of the vehicle 10 determined by the signals. The power switch 40 controls turning on and off of a power supply providing electric power to the entirety of the vehicle 10. Upon turning on of the power switch 40, initialization of the inverted pendulum control by the inverted pendulum control unit 46 is started. The stand switch 42 detects a deployment of the stands 18, and is turned on when the stands 18 are deployed forward and turned off when the stands 18 are retracted. The seat switch 44 detects the presence of a rider (user) on the saddle 14, and is turned on when the rider is seated on the saddle 14 and turned off when the user is not seated on the saddle 14. The inverted pendulum control unit 46 controls the drive unit of the vehicle 10 according to various signals including a signal from a gyro sensor 48, and provides the display unit 30 with information indicating the posture (position) of the vehicle 10.

In the present embodiment, the display control unit 36 turns on and off the light emitting elements 34 to provide a display indicating the direction for raising the outer shell 12 to the upright position (the direction in which the outer shell 12 is to be moved to raise the outer shell 12 to the upright position) or the direction for tilting the outer shell 12 to the forwardly tilted position (the direction in which the outer shell 12 is to be moved to tilt the outer shell to the forwardly tilted position) in response to a transition of the vehicle 10 between the tilted position (parked position) and the upright position.

More specifically, when the vehicle 10 is in the parked position, and is to be raised to the upright position, a part of the light emitting elements 34 are turned on while the remaining part of the light emitting elements 34 are turned off, and the light emitting elements 34 that are turned on are caused to move from the front to the rear in a cyclic manner. Alternatively, a part of the light emitting elements 34 are turned off while the remaining part of the light emitting elements 34 are turned on, and the light emitting elements 34 that are turned off are caused to move from the front to the rear in a cyclic manner. Alternatively, the light emitting elements 34 may be turned on one by one from the front-most one to the uppermost one so that the lighted region increases from the front end to the upper end. This may be repeated in a cyclic manner.

Conversely, when the vehicle 10 is in the upright position, and is about to be tilted forward to the parked position, a part of the light emitting elements 34 are turned on while the remaining part of the light emitting elements 34 are turned off, and the light emitting elements 34 that are turned on are caused to move from the rear to the front in a cyclic manner. Alternatively, a part of the light emitting elements 34 are turned off while the remaining part of the light emitting elements 34 are turned on, and the light emitting elements 34 that are turned off are caused to move from the rear to the front in a cyclic manner. Alternatively, the light emitting elements 34 may be all turned on at first, and may be turned off one by one from the front-most one to the uppermost one so that the lighted region recedes from the front end to the upper end while the turned off region increases from the front end to the upper end. This may be repeated in a cyclic manner.

Figure 5:
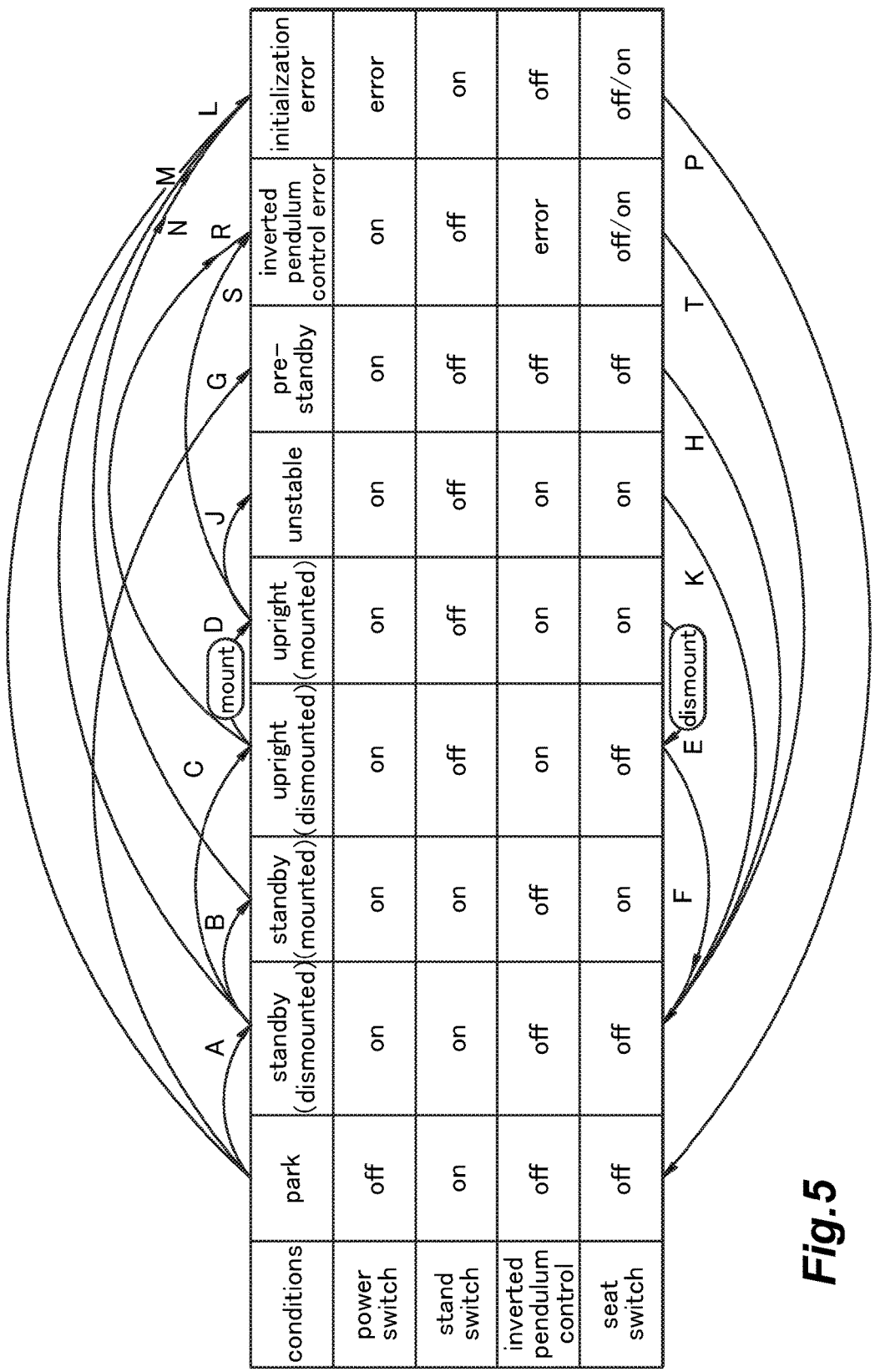
FIG. 5 is a diagram illustrating transition from one operating mode to another in the inverted pendulum vehicle.

FIG. 5 illustrates the mode of display on the display unit 30 at the times of transition from the parked position to the upright position, and from the upright position to the parked position.

In the parked position, the power switch 40, the seat switch 44 and the inverted pendulum control are all turned off, and the stand switch 42 is turned on. The vehicle 10 is stationary, and is supported by the stands 18 in a forwardly tilted attitude (see FIG. 2). The seat switch 44 is also turned off as the user is not seated on the saddle 14.

When the power switch 40 is turned on in the parked position, the inverted pendulum control is initialized (the inverted pendulum control is yet to be established) as indicated by arrow A, and when required, a self diagnosis of the inverted pendulum control unit 46 is performed by the self diagnosis unit 50. This condition is named as "standby condition". If the user is seated on the saddle 14 in this state as indicated by arrow B, the seat switch 44 is turned on.

Figure 2:
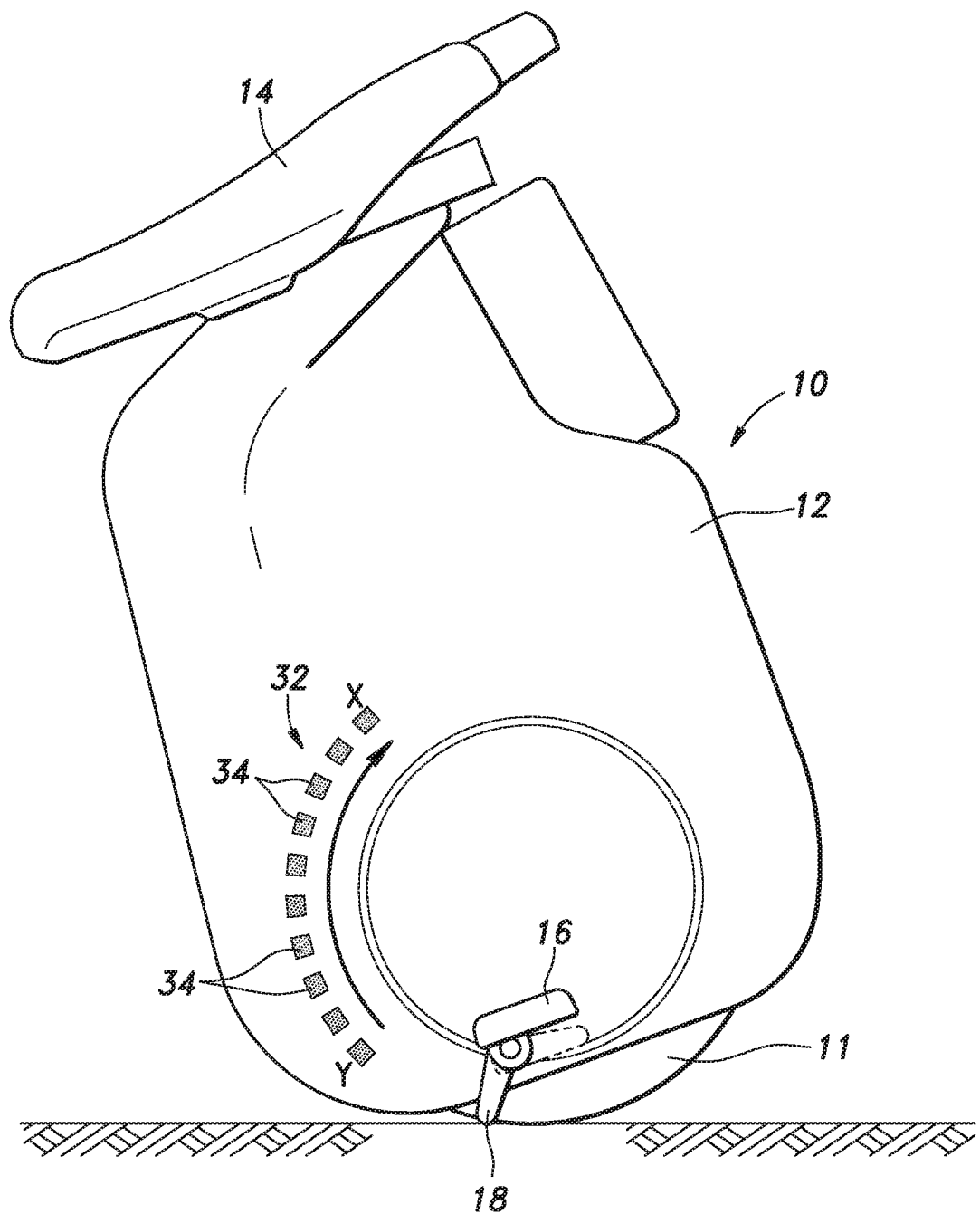
FIG. 2 is a side view of the inverted pendulum vehicle in a parked position.
Figure 3:
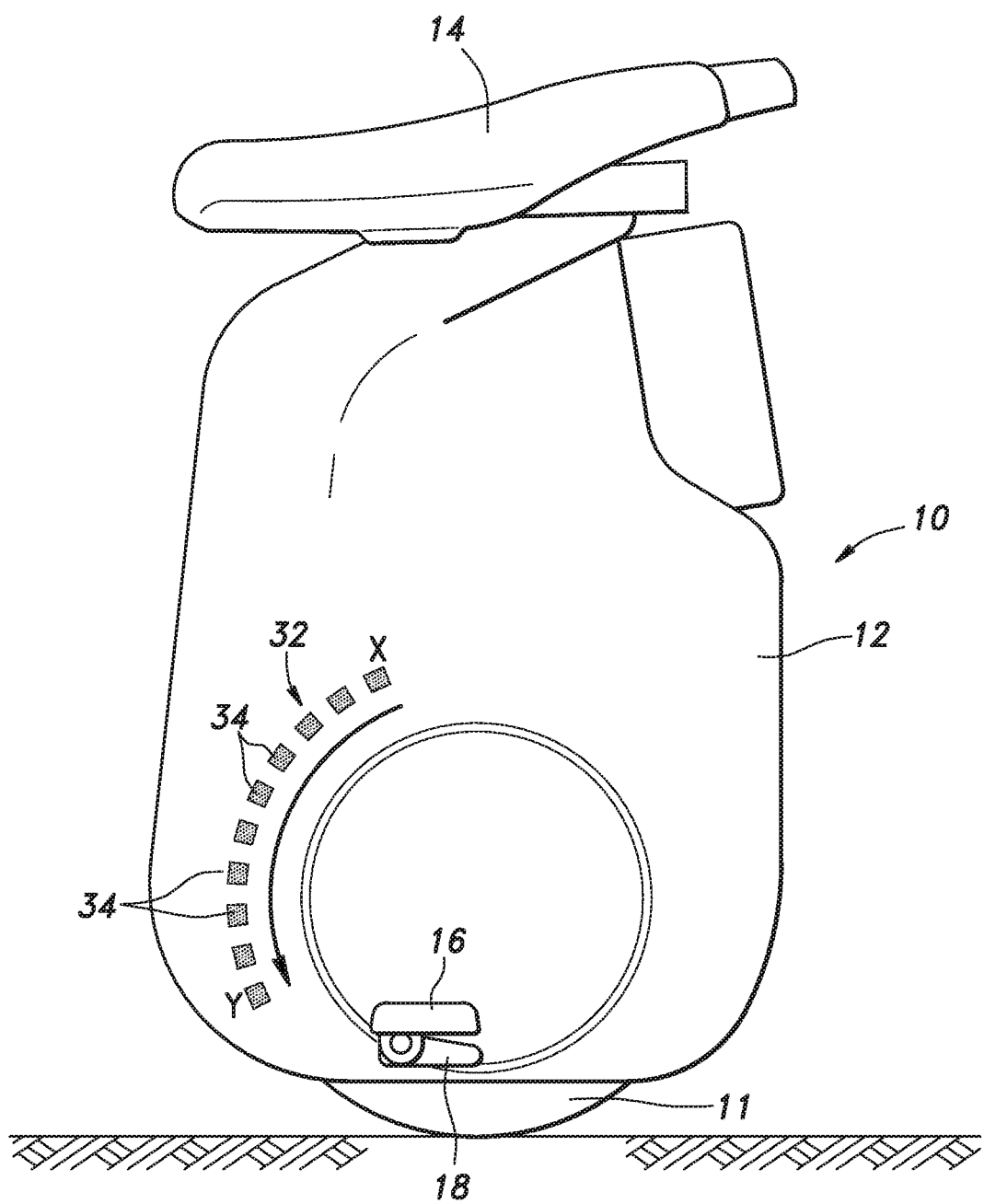
FIG. 3 is a side view of the inverted pendulum vehicle in an upright position.

Upon completion of the initialization, the display for indicating the direction to raise the outer shell 12 to the upright position is started, as indicated by an arrow in FIG. 2. The user is thus guided by the visual display to raise the vehicle 10 in the indicated direction. The user is intuitively guided as to what is required to be done. The light emitting elements 34 in this case may be lighted in green color.

The user then raises the outer shell 12 to the upright position (FIG. 3), and retracts the stands 18 as indicated by arrow C. Retracting the stands 18 causes the stand switch 42 to be turned off, and this activates the inverted pendulum control. Once the outer shell 12 is in the upright position, the display is terminated. The user may then mount the vehicle 10 as indicated by arrow D to travel on the vehicle 10.

When the user dismounts the vehicle 10 while the vehicle 10 is under the inverted pendulum control, the seat switch 44 is turned off as indicated by arrow E. At this time point, the display for guiding the direction to tilt the outer shell 12 to the forwardly tilted position is started, as indicated by an arrow in FIG. 3. The user is thus guided by the visual display to tilt the vehicle 10 (outer shell 12) in the indicated direction. The user is intuitively guided as to what is required to be done. The light emitting elements 34 in this case also may be lighted in green color.

When tilting the outer shell 12, the user deploys the stands 18 forward to cause the stand switch 42 to be turned on, and this terminates the inverted pendulum control as indicated by arrow F, allowing the outer shell 12 to be tilted forward by the user. Then, in accordance with the guide provided by the display, the user tilts the outer shell 12 forward until the outer shell 12 is supported by the stands 18 in the forwardly tilted position. The display is terminated when the outer shell 12 is brought to the prescribed forwardly tilted position. The user then can turn off the power switch 40.

If the user retracts the stands 18 and tries to raise the outer shell 12 after the power switch 40 is turned on but before the inverted pendulum control is fully initialized, the vehicle 10 is placed in a pre-standby condition as indicated by arrow G. At this time, the inverted pendulum control is not activated, and the user is guided by the visual display to tilt the outer shell 12 back to the forwardly tilted position. As it is not appropriate to operate the vehicle 10 before the initialization of the inverted pendulum control is complete, the user is guided to put the vehicle 10 (outer shell 12) back to the parked position by tilting it forward. In this case also, the user is guided intuitively what should be done. The light emitting elements 34 in this case may be lighted in red color.

Once the user puts the outer shell 12 back to the forwardly tilted position as indicated by arrow H, the initialization of the inverted pendulum control is resumed. At this point, the display in red color is terminated.

When the inverted pendulum vehicle 10 under the inverted pendulum control is tilted or receives an external force to such an extent as to cause the vehicle 10 to become unstable as indicated by arrow J, the user is guided by the display to tilt the outer shell 12 to the forwardly tilted position. The light emitting elements 34 in this case may be lighted in red color.

As indicated by arrow K, when the user dismounts from the saddle 14 and tilts the outer shell 12 back to the forwardly tilted position by following the guide display after deploying the stands 18, the inverted pendulum control is reset and initiated once again. Once the initialization of the inverted pendulum control is started, the display is terminated.

When an error is detected at the time of initialization as indicated by arrows L, M and N, the user may be notified of the detection of an error by the display, such as flashing of the light emitting elements 34 for a prescribed period of time. The light emitting elements 34 in this case may be lighted in red color.

Thereafter, as indicated by arrow P, the power switch 40 is turned off, and the vehicle 10 is placed in the parked condition.

When any failure or error is detected in the inverted pendulum control as indicated by arrows R and S, the user is guided by the visual display to tilt the outer shell 12 to the forwardly tilted position so that the inverted pendulum control may be reset in the parked condition. In this case also, the user is guided as to what should be done.

As indicated by arrow T, when the user dismounts from the saddle 14 and tilts the outer shell 12 back to the forwardly tilted position by following the guide display after deploying the stands 18, the initialization of the inverted pendulum control is started. The display in red color is terminated once the initialization of the inverted pendulum control is started.

As discussed above, according to the illustrated embodiment, the user of the inverted pendulum vehicle 10 is guided by the visual display clearly and intuitively as to what should be done in each of various situations.

Figure 6:
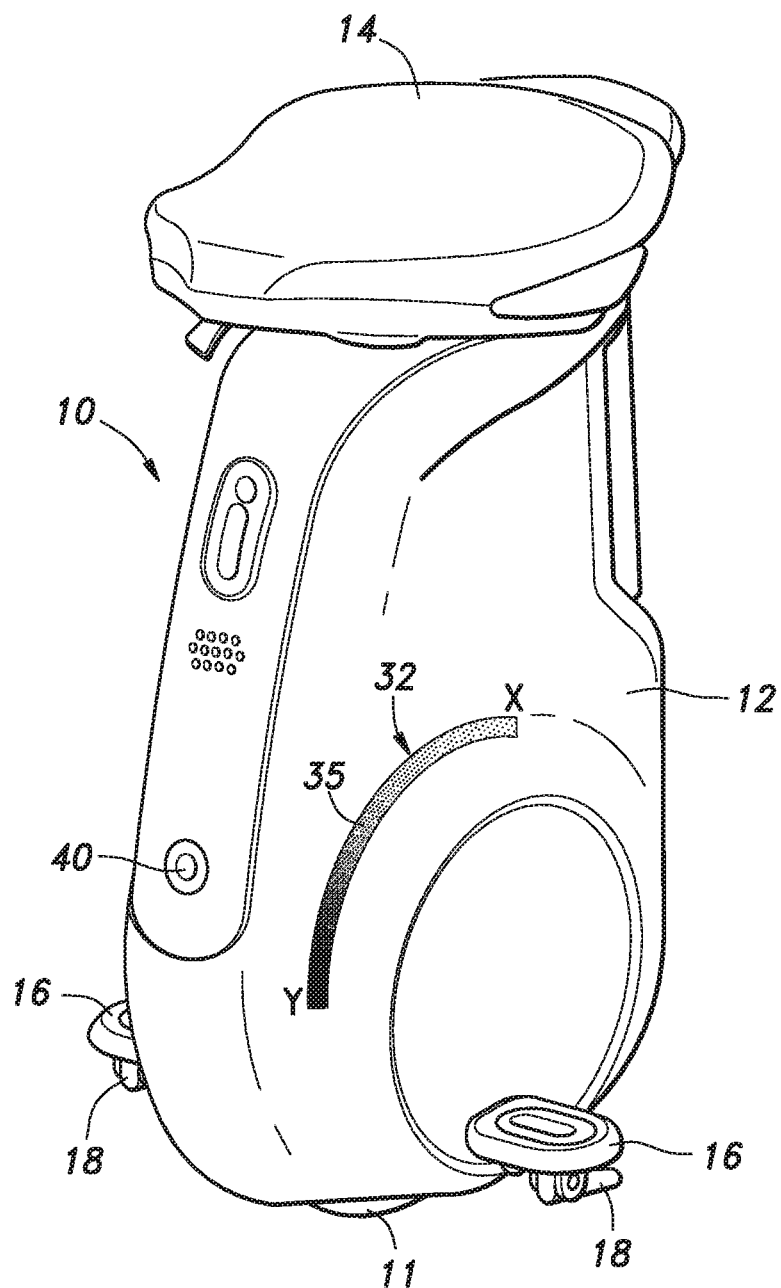
FIG. 6 is a view similar to FIG. 1 showing an alternate embodiment of an inverted pendulum vehicle according to the present invention.

An alternate embodiment of an inverted pendulum vehicle according to the present invention is described in the following with reference to FIG. 6. In the following description, parts corresponding to those of the previous embodiment are denoted by like numerals without necessarily repeating the description of such parts.

In this embodiment, the display portion 32 includes an arcuate light emitting strip 35 extending from a forward position Y to an upward position X along a circle (over an angular range of about 90 degrees) centered around the rotational center line of the main wheel 11. The light emitting strip 35 may consist of a plurality of discrete color light emitting elements, such as LEDs, arranged in a high density, and/or may be provided with a diffuser so that a continuous movement of the lighted part may be perceived by the viewer even though the light source consists of a plurality of discrete light emitting elements. In this case, the light emitting strip 35 may be controlled such that a part of the light emitting strip 35 which differs from adjoining areas of the light emitting strip 35 in luminous intensity and/or color is caused to move from the forward position Y to the upward position X or in the opposite direction depending on the direction to be guided. In other words, the luminous intensity and/or color of light emitted from parts of the light emitting strip 35 (or light emitting elements constituting the light emitting strip 35) is sequentially varied in the direction for guiding a user. The light emitting strip 35 may also be controlled such that the color of the emitted light gradually changes from the upward position X to the forward position Y (such as from blue to red, for example).

Although the present invention has been described in terms of preferred embodiments thereof, it is obvious to a person skilled in the art that various alterations and modifications are possible without departing from the scope of the present invention. For instance, the display portion 32 may consist of any other per se known light emitting elements such as liquid crystal, EL and fluorescent material. Also, the parked position may also consist of a rearwardly tilted position, instead of the forwardly tilted position.

The invention claimed is:

1. An inverted pendulum vehicle configured to be operated under an inverted pendulum control and comprising a vehicle body including a saddle provided in an upper part of the vehicle body,
   wherein the vehicle is configured to be selectively placed in a parked condition where the inverted pendulum control is terminated and the vehicle body is supported by a stand in a forwardly or rearwardly tilted position, and an upright condition where the vehicle body is held in an upright position under the inverted pendulum control, the vehicle further comprising a display unit for providing a guide on an operation for putting the vehicle body into the tilted position from the upright position or into the upright position from the tilted position according to a state of the vehicle.

2. The inverted pendulum vehicle according to claim 1, wherein the display unit is configured such that when the vehicle body is to be placed from the tilted position to the upright position, the display unit provides a display indicating a direction for bringing the vehicle body to the upright position until the vehicle body is placed in the upright position.

3. The inverted pendulum vehicle according to claim 2, wherein the inverted pendulum control is initialized when a power switch is switched from an off condition to an on condition, and the display unit is configured to start the display indicating the direction for bringing the vehicle body to the upright position upon completion of an initialization of the inverted pendulum control.

4. The inverted pendulum vehicle according to claim 3, wherein the display unit is configured such that when a movement to raise the vehicle body from the tilted position to the upright position is detected before the initialization of the inverted pendulum control is completed, the display unit provides a display indicating a direction for bringing the vehicle body to the tilted position.

5. The inverted pendulum vehicle according to claim 1, wherein the display unit is configured such that when a user has dismounted the vehicle while the inverted pendulum control is in progress, the display unit provides a display indicating a direction for bringing the vehicle body to the tilted position until the vehicle body is placed in the tilted position.

6. The inverted pendulum vehicle according to claim 1, wherein the display unit is configured such that when the vehicle is powered up, and the vehicle body is raised to the upright position, but a fault in the inverted pendulum control is detected, the display unit provides a display indicating a direction for bringing the vehicle body to the tilted position.

7. The inverted pendulum vehicle according to claim 1, wherein the display unit includes a plurality of light emitting elements arranged along a direction of moving of the vehicle body between the upright position and the tilted position, the light emitting elements being sequentially turned on and turned off in a direction for guiding a user.

8. The inverted pendulum vehicle according to claim 1, wherein the display unit includes a light emitting strip extending along a direction of moving of the vehicle body between the upright position and the tilted position, a part of the light emitting strip which differs from adjoining areas of the light emitting strip in luminous intensity and/or color being caused to move in a direction for guiding a user.

9. The inverted pendulum vehicle according to claim 7, wherein the light emitting elements are configured to emit light in a plurality of colors.

\* \* \* \* \*